United States Patent [19]
Antoun

[11] Patent Number: 6,045,300
[45] Date of Patent: Apr. 4, 2000

[54] TOOL HOLDER WITH INTEGRAL COOLANT PASSAGE AND REPLACEABLE NOZZLE

[76] Inventor: Gregory S. Antoun, 25 W. High St., Union City, Pa. 16438

[21] Appl. No.: 08/869,778

[22] Filed: Jun. 5, 1997

[51] Int. Cl.[7] .................................................. B23B 27/10
[52] U.S. Cl. ............................ 407/11; 407/6; 407/2; 82/901
[58] Field of Search .................. 407/11, 101, 102, 407/103, 105, 107, 109, 2, 5, 6; 222/80; 239/424, 601, 594, 592, 589, 600; 82/901

[56] References Cited

U.S. PATENT DOCUMENTS

| | | | |
|---|---|---|---|
| 3,104,826 | 9/1963 | Morris | 239/424 |
| 3,741,049 | 6/1973 | Anderson . | |
| 4,008,631 | 2/1977 | Hahn | 82/1 C |
| 4,621,547 | 11/1986 | Yankoff | 407/11 |
| 4,699,047 | 10/1987 | Lee et al. | 239/566 |
| 4,848,198 | 7/1989 | Royal et al. . | |
| 5,226,506 | 7/1993 | Link | 184/6.26 |
| 5,228,369 | 7/1993 | Itoh | 82/1.11 |
| 5,272,945 | 12/1993 | Lockard . | |
| 5,340,242 | 8/1994 | Armbrust et al. . | |
| 5,346,335 | 9/1994 | Harpaz et al. . | |
| 5,402,696 | 4/1995 | Hecht et al. . | |
| 5,439,327 | 8/1995 | Wertheim . | |
| 5,704,825 | 1/1998 | LeCompte | 239/594 |
| 5,718,156 | 2/1998 | Lagrolet | 82/1.11 |
| 5,829,331 | 11/1998 | Mori | 407/11 X |

FOREIGN PATENT DOCUMENTS 1230799  5/1986  U.S.S.R. .
795729   5/1958  United Kingdom .
2212078  7/1989  United Kingdom .

*Primary Examiner*—Andrea L. Pitts
*Assistant Examiner*—Henry W. H. Tsai
*Attorney, Agent, or Firm*—Richard C. Litman

[57] ABSTRACT

A tool holder for holding cutting inserts for machine tool work includes an integral cooling passage therethrough. Various coolant nozzles are interchangeably installable in the holder, to provide different amounts of coolant fluid flow depending upon the specific work being accomplished. The portion of the cooling passage in the tool holder adjacent to the installed nozzle, as well as the nozzles, are devoid of bends or changes in direction of the coolant flow path for greater efficiency and to ensure that the coolant flow is directed precisely at the cutting tip of the insert regardless of the radial orientation of the nozzle. The nozzles each incorporate a non-circular, preferably triangular, coolant outlet tip, which cross sectional shape blends smoothly with the circular cross sectional shape of the nozzle inlet and passage through the tool holder. The triangular cross section of the latter portion and outlet of the nozzle passage precludes any significant circumferential flow vector of the fluid flowing therethrough and flattens the sides of the fluid stream, thus precluding any significant pressure drop along the sides of the stream or expansion due to centrifugal reaction which would tend to pull the stream apart. The result is a cohesive stream which maintains its fluid force as it passes through the air from the nozzle to the insert cutting edge and workpiece. The tool holder may be adapted for use as a stationary holder for use with rotating workpieces, or as a rotating holder for use with relatively stationary workpieces.

2 Claims, 3 Drawing Sheets

TOOL HOLDER WITH INTEGRAL COOLANT PASSAGE AND REPLACEABLE NOZZLE

BACKGROUND OF THE INVENTION

1. FIELD OF THE INVENTION

The present invention relates generally to tools used for cutting and machining, and more specifically to various embodiments of a tool or insert holder having an integral coolant passage therewith. The holder may be adapted for stationary machining of a moving workpiece (e. g., lathe work), or may be adapted for rotary machining of a relatively stationary workpiece (e. g., milling). The tool holder includes a replaceable cooling nozzle having a novel coolant passage therethrough, which provides essentially laminar flow of coolant therethrough and precludes significant expansion of the coolant stream after it leaves the nozzle outlet, thereby providing greater chip breaking force and a greater volume of fluid contact with the cutting insert and workpiece to provide greater heat transfer.

2. DESCRIPTION OF THE RELATED ART

It is well known in the art of machining and cutting material, particularly metal, that the provision of some form of fluid (e.g., a light cutting oil of some sort) greatly prolongs the life of the cutting bit or insert between sharpenings, and also greatly speeds the cutting or machining of the material, by reducing friction and assisting in heat transfer from the working edge of the tool.

Accordingly, the practice of using such cutting fluid has been known for many years, and various cutting tool holders adapted for use with powered machine tools also have provision for the attachment of passages and/or nozzles for delivering a stream of cutting fluid to the cutting edge of the tool or tool insert. However, most such tool holders rely on clamps or similar arrangements to secure the nozzle to the tool holder, which procedure can result in misalignment of the nozzle with the cutting edge of the cutting insert, resulting in relatively little cutting fluid reaching the most critical point where it is needed.

Even where the nozzle is aimed relatively precisely, the fluid flow generally breaks up and forms more of a spray, rather than a cohesive liquid stream, as is desired. This is primarily due to the turbulent flow through conventional nozzles in combination with the extremely high pressures often used to deliver such coolant fluid, along with the circumferential flow vector which accompanies the round interior cross sectional shape of conventional nozzles. The sudden pressure drop as the fluid leaves the nozzle, along with the centrifugal reaction of the fluid due to the circumferential flow vector, results in rapid breakup and expansion of the fluid stream. The resulting spray cannot deliver the force required to break up chips from the cutting or machining process, and cannot provide efficient heat transfer. To this point, the solution has been to use ever increasing volumes and pressures of fluid, in an attempt to get sufficient fluid to the cutting tool edge to provide the desired chip breaking and cutting edge cooling actions.

Accordingly, a need will be seen for a tool holder which includes an integrated coolant passage therewith, with replaceable coolant nozzles to allow the machine operator to change nozzles having different size orifices according to the needs of the specific job. The various nozzles have an axial flow which is automatically aligned with the cutting edge of the tool insert for optimum efficiency. The nozzles also include a novel interior passage shape to provide cohesive fluid flow for the coolant after it leaves the nozzle. The present tool holder may be adapted for stationary use against a rotating workpiece, as in a lathe, or may comprise a rotating tool holder for use against a relatively stationary workpiece, as in a milling machine. A discussion of the related art known to the present inventor, and its differences and distinctions from the present invention, is provided below.

U.S. Pat. No. 3,741,049 issued on Jun. 26, 1973 to George B. Anderson describes a Cutting Tool for use in machining operations. The tool actually comprises a cutting bit or insert holder which in turn comprises a tool cartridge, a tool block, and a filler block for locating the tool cartridge on the tool block. A coolant fluid passage is provided through the tool block, but the coolant nozzle is not connected directly to this passage. Rather, the nozzle extends from the filler block, which has a passage therethrough which communicates with the tool block coolant passage. In any case, Anderson does not disclose any particular internal passage shape for the nozzle outlet, and discloses an elbow directing flow radially from the filler block passage.

U.S. Pat. No. 4,848,198 issued on Jul. 18, 1989 to Harold J. Royal et al. describes a Chip Breaking Tool Holder including a cutting insert clamp and main tool holder body. The clamp and body each have a coolant passage therethrough, with the two passages communicating with one another. While the Royal et al. coolant passage succeeds in directing the fluid flow directly toward the cutting edge of the insert, the connection between the passages of the two components is complex and requires a sophisticated seal. Moreover, this assembly must be loosened each time a cutting insert is changed or repositioned in the holder, thus increasing the chances of leakage. Royal et al. do not disclose any particular cross sectional shape for the internal passage of their nozzle.

U.S. Pat. No. 5,272,945 issued on Dec. 28, 1993 to Thomas A. Lockard describes a Toolholder Assembly And Method, wherein the coolant nozzle comprises a threaded bolt having a hollow center and partially cross drilled head, thereby forming a passage through the bolt with a radial outlet. The bolt is threaded into a mating passage in the tool block. The threaded configuration of the assembly allows the coolant nozzle bolt to be turned to direct the coolant flow as desired, but also allows for the inadvertent misalignment of the flow with the cutting edge of the insert. The axial outlet of the present nozzle precludes any possibility of misalignment. Also, Lockard discloses only a circular internal cross section for his coolant nozzle passage, unlike the non-circular configuration of the present coolant passage nozzle outlet.

U.S. Pat. No. 5,340,242 issued on Aug. 23, 1994 to William D. Armbrust et al. describes a Chip-Breaking Toolholder With Adjustable Orifice Cap. The toolholder body includes a coolant passage therethrough, but the fluid is further routed through a separate block having a coolant nozzle outlet therein. A hollow bolt secures the coolant nozzle block to the toolholder body, with fluid passing through the bolt and radially outward from a lateral passage below the head of the bolt, which communicates with the coolant nozzle block. The result is a complex assembly, requiring a plurality of seals as well as including an additional eccentrically headed bolt acting as a cam for adjustment of the coolant passage block. FIG. 2 of the Armbrust et al. patent makes clear the problem of coolant stream breakup which is solved by the present invention, but Armbrust et al. do not disclose any particular outlet shape for their coolant nozzle to address this problem.

U.S. Pat. No. 5,346,335 issued on Sep. 13, 1994 to Jacob Harpaz et al. describes a Metal Cutting Tool having a cutting insert with a coolant passage extending therethrough. The coolant passage communicates with a fluid passage in the tool holder block. Harpaz et al. require a specialized cutting insert for use with their tool; the cutting insert would be costly to produce, due to the forming of the coolant passage through the hardened material of the insert. Moreover, Harpaz et al. are silent regarding any cooling passage internal shape other than circular for their cutting tool.

U.S. Pat. No. 5,402,696 issued on Apr. 4, 1995 to Gil Hecht et al. describes a Seal Insert For The Shaft For A Workpiece, comprising a threaded insert which fits between a threaded coolant duct nipple and the unthreaded end of a tool holder adaptor. The device acts as a connector between the coolant nipple and the adaptor in cases where the adaptor does not have a mating threaded end to fit the nipple (e. g., where the adaptor has been shortened by cutting off the threaded end). No disclosure is made of any coolant nozzle configuration or orientation, although Hecht et al. mention the coolant flowing from apertures "so as to be sprayed on to the work piece . . . " (column 3, lines 53–54). Thus, Hecht et al. recognize the problem of the coolant flow dissipating as a spray, rather than being concentrated as a cohesive stream, but offer no solution to the problem.

U.S. Pat. No. 5,439,327 issued on Aug. 8, 1995 to Raphael Wertheim describes a Metal Cutting Tool wherein the cutting insert holder includes at least one coolant passage which terminates at an external edge adjacent at least one face of the cutting insert. The inserts are specially formed with at least one external coolant channel formed between the coolant passage outlet of the tool holder and the working edge of the insert. The specially formed inserts are thus relatively difficult and costly to manufacture, as in the case of the inserts of the '335 patent to Harpaz et al (Wertheim being a co-inventor), discussed further above. No mention is made by Wertheim of any particular cross sectional shape of the interior of the coolant passage in the tool holder block.

British Patent Publication No. 795,729 published on May 28, 1958 describes Improvements In Cutting Tools For Lathes, comprising a cutting tip which is brazed or cemented to the tool insert, the insert in turn being bolted to the tool holder. The tool holder and insert are adapted to provide a jet of carbon dioxide (rather than a cooling oil or other liquid) terminating in a plurality of fine channels (rather than a single liquid outlet) "which are directed away from the cutting tip of the tool . . . " (page 2, column 1, lines 32–33) rather than toward the cutting tip. The disclosure also teaches the direction of the gas away from the chips being cut, in order to avoid cooling the chips. This teaches away from the present invention, in which the coolant is directed at the cutting tip of the insert, and thus at chips as they are being cut. The shock cooling action on the chips assists in breaking up the chips, which is considered desirable.

British Patent Publication No. 2,212,078 published on Jul. 19, 1989 describes a Cutting Tool With Cutting Fluid Channel disposed along the outer surface of the tool. This teaches away from the internal passage of the present tool holder, and cannot direct a stream of fluid under high pressure as provided by the present invention.

Finally, Soviet Patent Publication No. 1,230,799 published on May 15, 1986 illustrates a Water Cooling System For Tipped Lathe Tools wherein at least the tool block and insert holder include coolant passages therethrough. The insert holder includes a plurality of relatively small passages, to distribute the coolant over the face of the cutting insert. The assembly includes a compensating plate for retaining the coolant until it reaches a sufficiently high temperature to vaporize, whereupon the coolant flows from the outlets of the insert holder as steam. The liquid coolant used with the present invention is not heated to such a degree, as it is separated from the cutting tip before being ejected from the outlet nozzle extending from the tool block. As in the case of the related art discussed above, the Soviet patent makes no disclosure of other than circular or semicircular internal shapes for the coolant passages.

None of the above inventions and patents, either singly or in combination, is seen to describe the instant invention as claimed.

SUMMARY OF THE INVENTION

The present invention comprises a tool holder having an integral coolant passage and nozzle for ejecting a cohesive stream of liquid coolant directly toward the tip of the cutting insert secured by the tool holder. The nozzle is easily replaceable and interchangeable for nozzles having different outlet dimensions for different types of work. The nozzles each have a novel cross section to provide cohesive and substantially laminar flow of the coolant after it leaves the nozzle, thus providing a concentrated stream of liquid to the cutting edge of the insert secured in the present tool holder. The nozzle outlet essentially eliminates any circumferential flow vector therein, greatly reducing centrifugal effect which causes typical streams to break up and expand.

Accordingly, it is a principal object of the invention to provide an improved machine tool holder having an integral coolant passage therethrough.

It is another object of the invention to provide an improved coolant nozzle which may be interchangeably installed to the coolant passage of the tool holder.

It is a further object of the invention to provide an improved coolant nozzle providing purely axial flow therethrough, and including a non-circular outlet cross section for precluding circumferential fluid flow within the nozzle outlet, thereby providing a cohesive fluid stream for fluid departing the nozzle outlet.

An additional object of the invention is to provide an improved machine tool holder incorporating the above described features and adapted for essentially stationary disposition against a rotating workpiece.

Still another object of the invention is to provide an improved machine tool holder incorporating the above described features and adapted for rotary disposition against an essentially stationary workpiece.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a tool holder for holding a cutting insert for use with machine tools in machining operations. Such machine tools are almost universally provided with some form of coolant means for supplying a liquid coolant to the interface between the cutting edge of the insert and the workpiece being machined. The present tool holder in its various embodiments includes an integral coolant passage therethrough, with a replaceable coolant nozzle which provides significant improvements in controlling and directing the flow of a liquid stream of coolant to the cutting edge of the insert.

Figure 1:
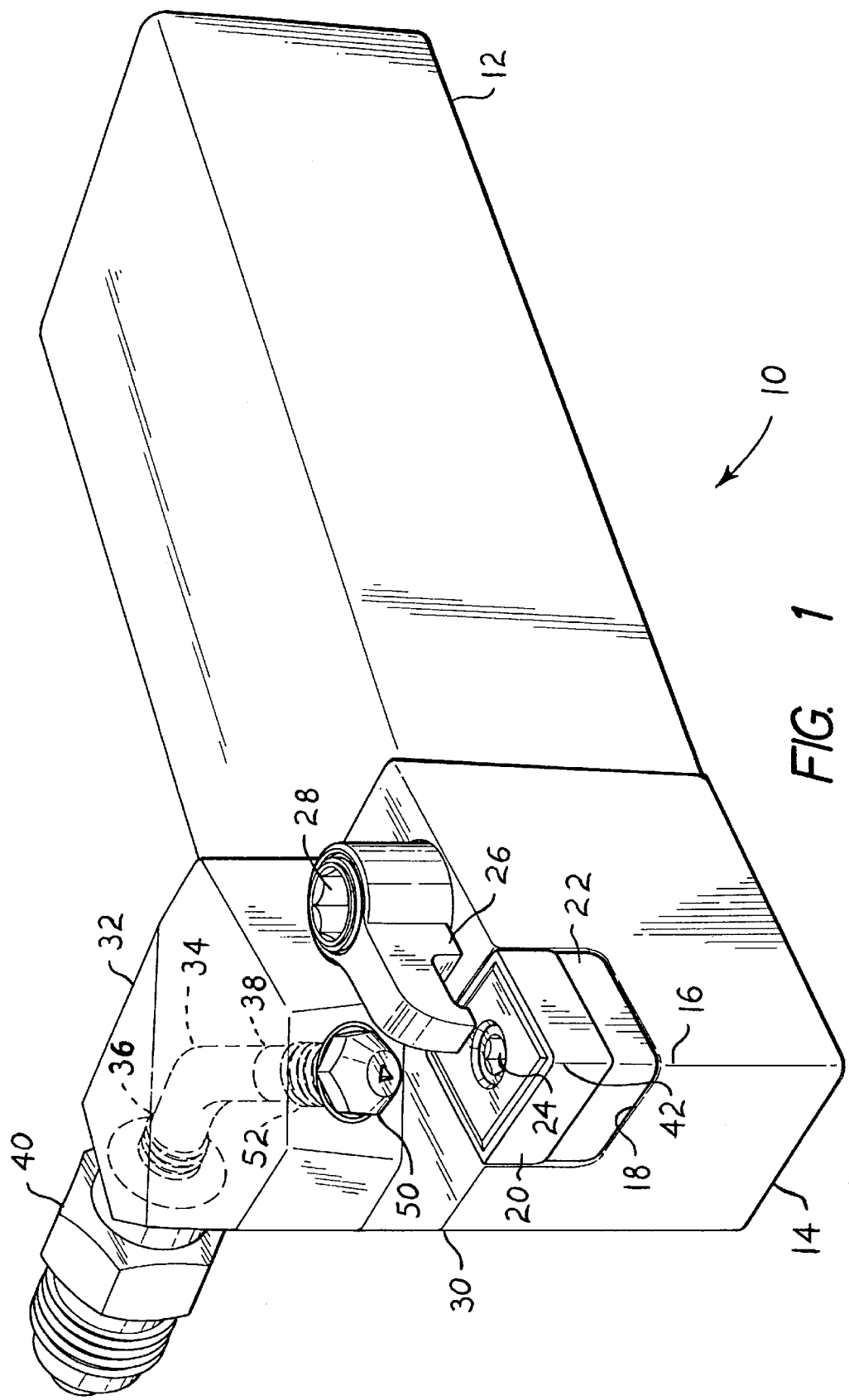
FIG. 1 is a front perspective view the present tool holder, showing its general features.

FIG. 1 provides a perspective view the present tool holder, designated by the reference numeral 10. The holder 10 comprises an elongate unitary, monolithic and generally rectangular block of hard metal, having a solid rectangular mounting end 12 providing for securing the holder 10 removably to a holding fixture on a machine tool, and an opposite cutting insert attachment end 14.

The cutting insert attachment end 14 has a first or cutting insert corner 16 with a cutting insert recess 18 formed therein. This insert recess 18 is configured to accept a cutting insert 20, perhaps with a spacer 22, removably therein. (While a rectangular recess 18 and corresponding insert 20 are shown, it will be understood that the present tool holder 10 may be configured to accept a wide variety of insert shapes and configurations, and is not limited only to a rectangular insert 20 as shown in FIG. 1.) The insert 20, and spacer 22, are removably secured within the recess 18 by an insert bolt 24 and a finger clamp 26 which is threadedly secured to the holder 10 by a clamp bolt 28.

The insert attachment end 14 of the holder 10 has a truncated second corner 30, generally laterally opposite the first or insert attachment corner 16, with a coolant passage block 32 extending therefrom. The coolant passage block 32 is formed integrally and monolithically with the remainder of the tool holder block 10, as a single unit. A coolant passage 34 is provided through the block 32, with the coolant passage 34 having an inlet end 36 and opposite outlet end 38.

The inlet end 36 of the coolant passage 34 includes a coolant line attachment fitting 40 extending therefrom, with the inlet end 36 being formed to position the attached fitting 40 conveniently for attachment to a conventional external coolant line (not shown). However, the opposite outlet end 38 of the coolant passage 34 is diagonally oriented to be aligned at least generally with the cutting edge or corner 42 of the cutting insert 20 which has been secured to the holder 10. This configuration of the coolant passage 34 may result in a bend or angle somewhere in the passage 34, but it will be seen that the outlet end 38, and portion of the passage 34 at least immediately upstream therefrom, is diagonally aligned with the cutting edge or corner 42 of the insert 20, to provide smooth and efficient coolant fluid flow.

Figure 2:
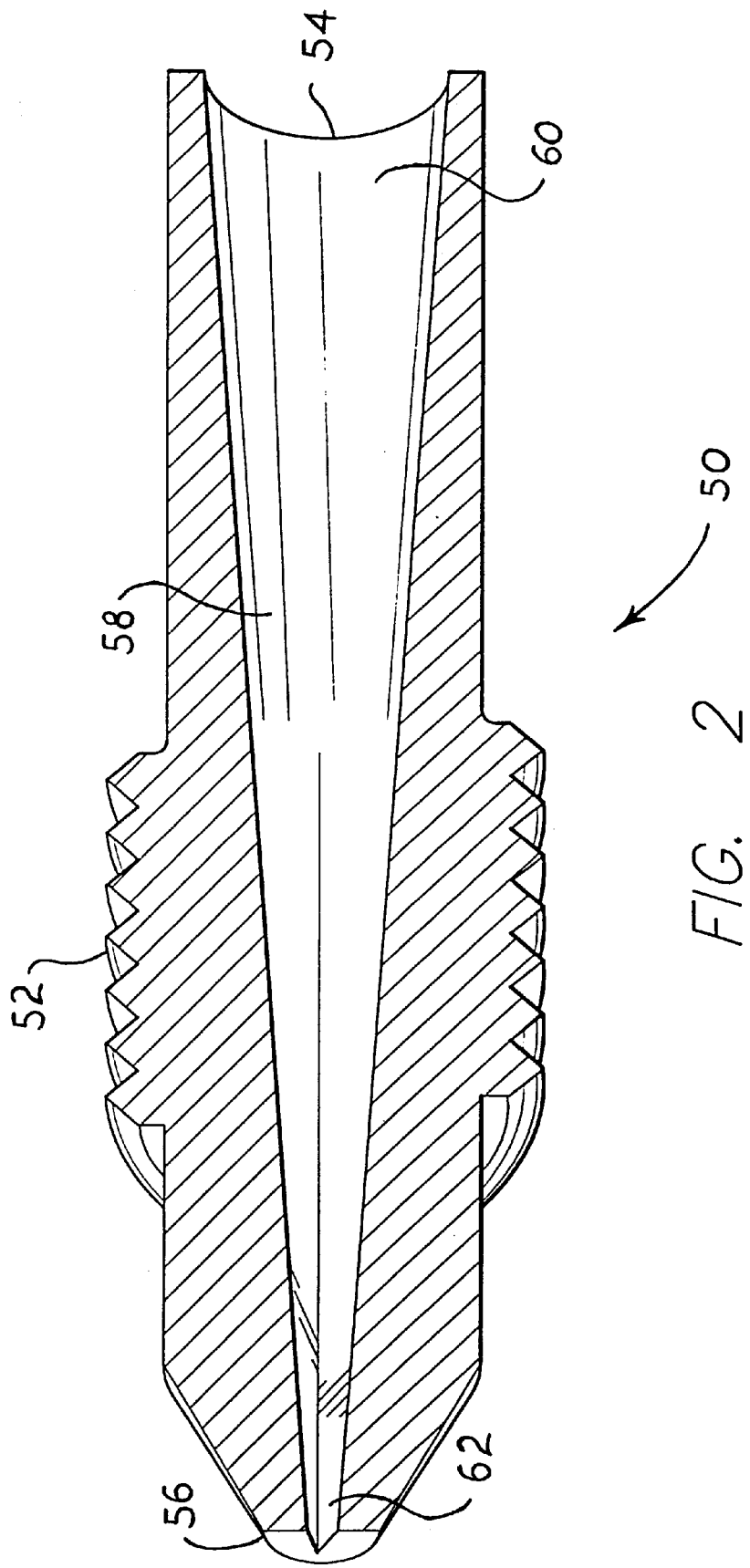
FIG. 2 is a perspective view in section of a coolant nozzle used with the present tool holder.
Figure 3:
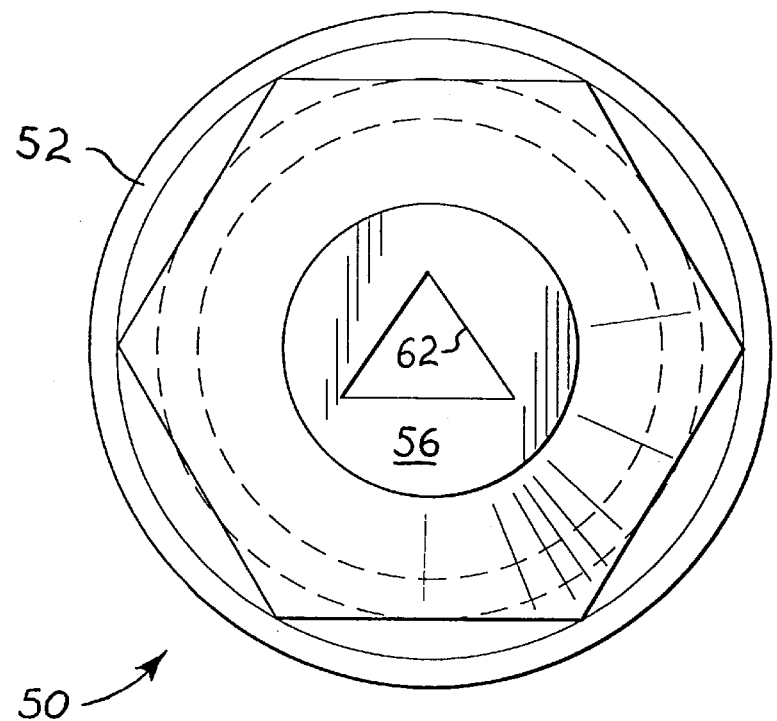
FIG. 3 is a front or outlet end elevation view of the coolant nozzle of FIG. 2.
Figure 4:
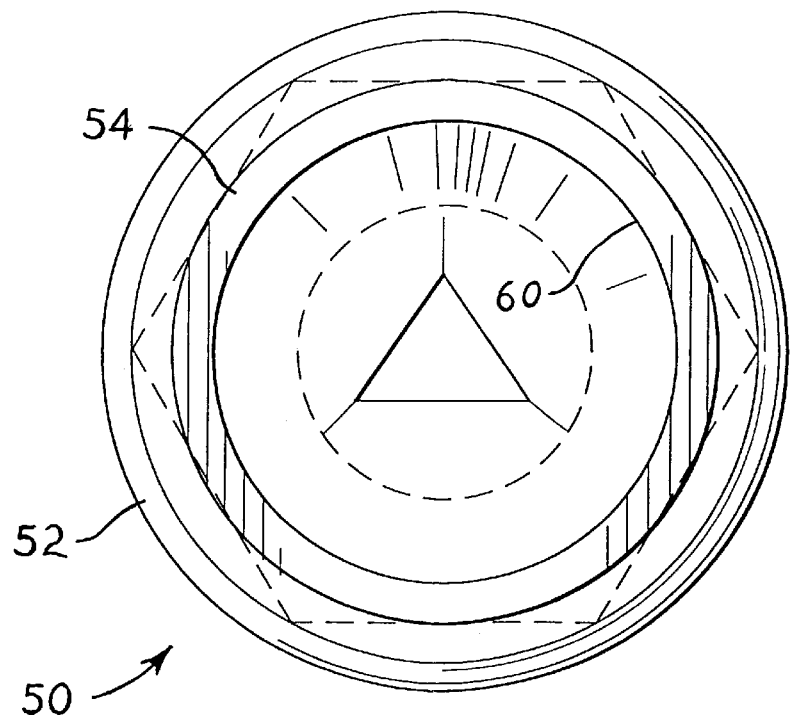
FIG. 4 is a rear or inlet end elevation view of the coolant nozzle of FIG. 2.

The outlet end 38 of the coolant passage 34 includes a coolant nozzle 50 which is removably installed within the passage outlet end 38, as by the threaded portion 52 of the nozzle 50 which mates with a conventionally internally threaded portion of the coolant passage outlet end 38. Details of the coolant nozzle 50 are shown in FIGS. 2 through 4. The coolant nozzle 50 is formed as a unitary, monolithic component, of a relatively hard metal in order to withstand the high fluid pressures which may be applied to the device. The nozzle 50 includes an inlet end 54 which fits closely into the outlet end 38 of the nozzle block coolant passage 34, and an opposite nozzle outlet end 56, which is generally aligned with the insert cutting corner or edge 42 when the nozzle 50 is installed in the coolant passage outlet end 38 of the block 10.

The coolant nozzle 50 is essentially in the form of a straight cylindrical tube, with coolant passing through a straight, axial coolant passage 58 which extends from the nozzle inlet end 54 to the opposite nozzle outlet end 56. The passage 58 has a relatively large diameter, cylindrical cross section shape at its inlet end portion 60, but the opposite outlet end portion 62 has a considerably smaller cross sectional area in order to direct the coolant fluid in a tightly controlled stream to the insert cutting edge 42 and its interface with a workpiece during machining operations.

It will be seen that the outlet end portion 62 of the coolant nozzle 50 has a non-circular cross section, preferably of a polygonal configuration. More specifically, the nozzle outlet end portion 62 comprises a triangular cross section, although other non-circular or polygonal sections (rectangular, etc.) might also be found to provide the desired control of the coolant stream, depending upon the flow and velocity of the coolant as it passes through and leaves the nozzle. The polygonal shape of the nozzle outlet end portion 62 is blended smoothly into the larger diameter of the circular shape of the nozzle outlet end portion 60, as shown in the nozzle cross section of FIG. 2. This may be accomplished by means of a suitable machining process (e. g., wire EDM process). It is critical that the nozzle passage 58 have a smooth and continuous change in cross sectional shape which is devoid of lateral edges from the inlet end 54 to the opposite outlet end 56 of the nozzle 50, to provide the desired coolant flow characteristics.

Conventional coolant systems have been found to impart at least some turbulence to the coolant as it flows through the coolant passages, particularly through the coolant nozzle itself. This is due to "steps" or lateral edges protruding into the coolant nozzle passage as the bore of the passage decreases from a large diameter at the inlet end to a smaller diameter at the outlet end, and other factors, such as sharp bends as the fluid transitions from axial flow through the nozzle body to radial flow through a radially disposed outlet passage. This turbulence leads to the breakup of the coolant stream as it exits the outlet end of such a conventional nozzle, causing the coolant stream to widen into a spray pattern rather than retaining its cohesiveness as a liquid stream. Such a coolant spray cannot provide the physical force required to break up metal chips as they are cut from the workpiece during machining operations, and moreover cannot provide sufficient fluid mass to carry away heat efficiently. The present nozzle 50 obviates these turbulence inducing obstructions by means of the straight axial passage 58 which is aligned axially with the coolant passage 34 through the block 32 of the holder block 10, and the smooth transition from the inlet end 54 to the outlet end 56 of the nozzle 50.

Another problem with conventional coolant delivery systems is that the coolant fluid will almost always have some non-axial component of flow induced to the coolant stream within the lines and coolant nozzle, due to curves in the lines, non-axial bends in the passages, and/or various misaligned internal obstructions. Such non-axial flow produces a component of circumferential flow to the fluid, which imparts a centrifugal reaction to the circumferential fluid flow. This, along with the turbulent flow discussed above, causes the fluid flow to expand suddenly upon departing the outlet end of the nozzle, thereby producing a relatively wide spray of fluid and vapor, rather than a coherent fluid stream, as is desired.

The present nozzle provides substantial laminar flow through the interior thereof, due to the smooth internal passage walls which are devoid of edges and obstructions. Also, the polygonal cross sectional shape of the passage walls near the outlet end of the nozzle, cause the fluid to follow the longitudinal lines of the passage defined by the flat walls and apices of the triangular nozzle outlet cross section. Any non-linear flow vector of the coolant is essentially eliminated by the time the fluid reaches the outlet end 56 of the present nozzle 50, thus eliminating any centrifugal effect which would otherwise cause the fluid to spread upon leaving the outlet end 56 of the nozzle 50. The smooth, laminar flow provided by the present nozzle 50, along with the elimination of any circumferential flow due to the non-circular outlet portion of the nozzle 50, serve to retain a narrow and cohesive fluid stream as the coolant departs the outlet end 56 of the nozzle 50. This allows the fluid to impact chips with much greater force than would be provided by a spray, thereby breaking up chips more readily. The more concentrated mass of the fluid stream also absorbs more heat from the workpiece, insert, and chips.

It has been found that the sudden cooling of such chips as they are cut from the workpiece is an important factor in causing them to break away from the workpiece, and the present coolant nozzle 50 is of great assistance in providing a relatively large mass of coolant directed to the critical point, in order to provide the desired sudden cooling of chips as they are cut from the workpiece.

It will be noted that the present coolant nozzle may be provided in virtually any practicable size, depending upon the desired volume of coolant flow and velocity at the nozzle outlet. For example, a coolant pressure of 2500 pounds per square inch will require a nozzle outlet end maximum width of about 0.081 inch in order to provide a flow of 8 gallons per minute. This results in a coolant fluid stream velocity of up to 500 miles per hour, thus delivering substantial impact forces for chip breakup, as well as providing a significant fluid volume in a concentrated stream for heat transfer. Other nozzle sizes may be provided, depending upon the coolant flow and velocity desired. Coolant flow may vary down to about 4 gallons per minute, and up to about 20 gallons per minute, with the width of the nozzle outlet varying accordingly. Nozzle outlet end widths from about 0.040 inch to about 0.12 inch have been found to provide suitable fluid flows and velocities, depending upon the specific machining operation being conducted. The present nozzle in any of its different size embodiments is interchangeable, so nozzles of different outlet sizes may be removed and replaced easily to adjust fluid flow as desired.

In summary, the present tool holder in its various embodiments will be seen to provide a significant advance in the technology of cooling workpieces and cutting tips or inserts during machining operations. The coolant nozzle associated with the present tool holder provides significant improvements in the delivery of a cohesive stream of coolant fluid directly to the workpiece and insert interface, to provide optimum force for chip removal and also optimum fluid mass for maximum heat transfer from workpiece and insert to the coolant. The non-circular outlet of the present nozzle provides a novel means to eliminate various characteristics which lead to the breakup of the coolant stream in other nozzles of the related art. It will be seen that the present nozzle, while being shown with a tool holder for use in a relatively stationary position against a rotating workpiece, is also adaptable for use with rotating tool holders for use against a relatively stationary workpiece (mills, etc.). Thus, the present tool holder and nozzle will serve to advance the efficiency of machining operations in various environments.

It is to be understood that the present invention is not limited to the sole embodiments described above, but encompasses any and all embodiments within the scope of the following claims.

I claim:

1. A tool holder for holding a cutting insert with a cutting edge for use with machine tools, comprising:

a monolithic, substantially rectangular tool holder block having a mounting end for removably securing to a machine tool, and an opposite cutting insert attachment end;

said cutting insert attachment end having a first corner with a cutting insert recess formed therein for removably securing a cutting insert therein;

said cutting insert attachment end further having a second corner diagonally opposite said first corner, with a coolant passage block extending upward from said second corner and formed integrally and monolithically with said tool holder block;

said coolant passage block including a coolant passage extending therethrough;

said coolant passage having an inlet end and an opposite outlet end with said outlet end of said coolant passage being diagonally aligned with the cutting edge of the cutting insert when secured within said cutting insert recess; and at least one coolant nozzle for removably installing within said outlet end of said coolant passage, said coolant nozzle having a straight coolant nozzle passage formed therethrough and aligned with the cutting edge of the cutting insert when said coolant nozzle is installed in said outlet end of said coolant passage, wherein said coolant nozzle passage includes an inlet end having a circular internal cross section and an opposite outlet end having a polygonal internal cross section for said coolant nozzle passage, with said outlet end having a substantially smaller cross section than said inlet end.

2. The tool holder according to claim 1, wherein said outlet end of said coolant nozzle passage has a triangular cross section.

* * * * *